United States Patent [19]

Mori et al.

[11] Patent Number: 5,252,668

[45] Date of Patent: Oct. 12, 1993

[54] ONE-PACK CHLOROPRENE ADHESIVE

[75] Inventors: Masahito Mori, Takatsuki; Masaaki So, Ibaraki, both of Japan

[73] Assignee: Sunstar Giken Kabushiki Kaisha, Takatsuki, Japan

[21] Appl. No.: 358,209

[22] Filed: May 30, 1989

[30] Foreign Application Priority Data

May 30, 1988 [JP] Japan ................... 63-134062

[51] Int. Cl.$^5$ ............ C08F 8/32; C08L 9/00
[52] U.S. Cl. .................. 525/102; 525/104; 524/273; 524/502
[58] Field of Search ............ 525/102, 104; 524/273, 524/502

[56] References Cited

U.S. PATENT DOCUMENTS 4,581,281 4/1986 Gerace .................. 428/465
4,603,712 8/1986 Krause .................. 428/520

FOREIGN PATENT DOCUMENTS 0171986 2/1986 European Pat. Off. .
2835289 2/1979 Fed. Rep. of Germany ...... 524/273

OTHER PUBLICATIONS

Kirk–Othmer Encyclopedia of Chemical Technology, "Hydrocarbon Resins", vol. 12, 3rd Ed., pp. 852–861 (1980).

Primary Examiner—James J. Seidleck
Assistant Examiner—Vasu S. Jagannathan
Attorney, Agent, or Firm—Wegner, Cantor, Mueller & Player

[57] ABSTRACT

One-pack chloroprene adhesive having excellent adhesion and excellent heat resistance, particularly excellent heat aging resistance, which comprises a chloroprene rubber modified with an aminosilane, a petroleum resin as a tackifier resin and an organic solvent, which is useful for adhering and laminating various products such as metallic materials, woven fabrics, fiber products, wooden products, leather products, plastic materials, etc.

3 Claims, No Drawings

ONE-PACK CHLOROPRENE ADHESIVE

This invention relates to a one-pack chloroprene adhesive, more particularly to an improved one-pack chloroprene adhesive having excellent adhesion and particularly improved heat aging resistance which comprises a chloroprene rubber modified with an aminosilane, a petroleum resin (as a tackifier resin) and an organic solvent.

BACKGROUND OF THE INVENTION

Various rubber adhesives, particularly chloroprene adhesives comprising as a base rubber a chloroprene rubber, are utilized in various fields. There is known a one-pack chloroprene adhesive comprising a chloroprene rubber, a tackifier, and optionally a vulcanizing agent or a vulcanizing accelerator which are dissolved in an appropriate organic solvent. However, the known adhesive has inferior heat resistance, particularly less strength or creep properties at a high temperature (80°–130° C.), and hence, it is usually used in the form of a two-pack type of adhesive. That is, the chloroprene adhesive is used in combination with a polyisocyanate curing agent.

The present inventors had intensively studied as to an improved one-pack chloroprene adhesive which can exhibit the same or more excellent adhesion with high heat resistance than the two-pack type of chloroprene adhesive, and had found that when the chloroprene rubber is modified with an aminosilane or isocyanate silane, the rubber can exhibit excellent strength and creep properties even at a high temperature. This is because the silane promotes a crosslinking reaction in the presence of moisture once applied. U.S. patent application Ser. No. 058,849 was filed on Jun. 5, 1987 which was re-filed as a Continuation-in-part application on Mar.14, 1989. However, it has now been found that when the chloroprene rubber modified with an aminosilane is incorporated with a phenolic tackifier resin (e.g. alkylphenol resins, terpene-modified phenol resins, etc.) as disclosed in said U.S. patent application, the composition still shows deterioration in properties by heating and less heat aging resistance. The present inventors have further studied to find a more improved one-pack chloroprene adhesive without using phenolic resin which induces the deterioration of properties by heating, and have now found that when a petroleum resin is used as the tackifier resin, the adhesive composition shows more improved heat aging resistance.

OBJECT OF THE INVENTION

An object of the invention is to provide an improved one-pack chloroprene adhesive having excellent adhesion and heat resistance, particularly improved heat aging resistance. Another object of the invention is to provide a one-pack adhesion comprising a modified chloroprene rubber as a base rubber which can exhibit excellent adhesion with heat aging resistance even at a high temperature. These and other objects and advantages of the invention will be apparent to those skilled in the art from the following description.

DESCRIPTION OF THE PREFERRED EMBODIMENTS

The one-pack chloroprene adhesive of this invention comprises a chloroprene rubber modified with an aminosilane, a petroleum resin and an organic solvent.

The chloroprene rubber includes any available chloroprene rubber, such as Neoprene WHV (manufactured by Showa Neoprene K.K., Japan), Neoprene W (manufactured by Showa Neoprene K.K., Japan), Denka Chloroprene (manufactured by Denki Kagaku Kogyo K.K., Japan), and Skiprene (manufactured by Toyo Soda K.K., Japan).

The aminosilane used for the modification of a chloroprene rubber includes, for example, aminomethyltriethoxysilane, N-($\beta$-aminoethyl)aminomethyltrimethoxysilane, aminomethylmethyldiethoxysilane, N-(8-aminoethyl)-aminomethyltributoxysilane, $\gamma$-aminopropyltriethoxysilane, $\gamma$-aminopropylmethyldiethoxysilane, $\gamma$-aminoisobutyltrimethoxy-silane, N-($\beta$-aminoethyl)-$\gamma$-aminopropyltrimethoxysilane, N-($\beta$-aminoethyl)-$\gamma$-aminopropylmethyldimethoxysilane, N-($\beta$-aminoethyl)-$\gamma$-amino-$\beta$-methylpropyltrimethoxysilane, and the like.

The modification of the chloroprene with the aminosilane can be carried out by reacting 2-Cl of 1,2-chloroprene moietys which is contained in an amount of about 2 % by weight in the conventional chloroprene rubbers with the aminosilane, that is, by adding 1 to 10 parts by weight of an aminosilane to a solution of a conventional chloroprene rubber (100 parts by weight, in solid) in an organic solvent (e.g. toluene, xylene, cyclohexane, acetone, etc.), and mixing the mixture at room temperature to an elevated temperature (e.g. 40° C) for 1 to 4 hours. The modification of chloroprene rubber may also previously be carried out, but may be carried out simultaneously in the preparation of the one-pack chloroprene adhesive.

The petroleum resin used as a tackifier resin in this invention includes conventional petroleum resins, such as $C_4$–$C_5$–$C_6$ aliphatic peteroleum resins, $C_8$–$C_9$–$C_{10}$ aromatic petroleum resins, aliphatic-aromatic petroleum resins, and alicyclic petroleum resins as disclosed in Kirk-Othmer, "Encyclopedia of Chemical Technology", Third Edition, Volume 12, pages 854–861. These are commercially available, for example, aliphatic petroleum resins such as Escorez (manufactured by Tonen Sekiyu Kagaku K.K.), Hi-Rez (manufactured by Mitsui Peterochemical Industries), Quintone (manufactured by Nippon Zeon K.K.), Tackirol (manufactured by Sumitomo Chemical Co., Ltd.); aromatic petroleum resins such as Petrosin (manufactured by Mitsui Petrochemical Industries), Neopolymer (manufactured by Nippon Petrochemicals Co., Ltd.); aliphatic-aromatic petroleum resins such as Hiresin (manufactured by Toho Petroleum Resin Co., Ltd.); and alicyclic petroleum resins such as Arkon (manufactured by Arakawa Forest Chemical Industries). The tackifier resin is usually used in an amount of from 5 to 100 parts by weight, preferably 10 to 60 parts by weight, to 100 parts by weight of the chloroprene rubber (weight before the modification thereof).

The organic solvent used in this invention includes, for example, aromatic solvents (e.g. toluene, xylene, etc.), ketones (e.g. acetone, methyl ethyl ketone (MEK), methyl isobutyl ketone (MIBK), etc.), alicyclic solvents (e.g. cyclohexane, etc.), chlorinated hydrocarbons (e.g. trichloroethylene, etc.), and the like. The organic solvent is usually used in an amount of 150 to 1,500 parts by weight, preferably 400 to 800 parts by weight, to 100 parts by weight of the chloroprene rubber (weight before the modification thereof).

The one-pack chloroprene adhesive of this invention comprises a chloroprene rubber modified by an aminosilane, a petroleum resin as a tackifier resin and an organic solvents and optionally a stabilizer (e.g. magnesia, zinc oxide, etc.) in order to stabilize the components during the step of mixing and kneading of the mixture of the components. The adhesive may also contain other conventional additives, such as fillers, dehydrating agents, plasticizers, antioxidants, etc. Moreover, methanol may optionally be added thereto in order to improve the storage stability of the composition.

The adhesive of this invention can be prepared by mixing and kneading the components in a usual manner, for example, by rolling mill process, or by dissolving directly the modified chloroprene rubber, tackifier resin, etc. in the organic solvent.

The adhesive of this invention can be applied to various materials, for example, metallic materials, woven fabrics, fiber products, wooden products, leather products, plastic materials (in the forms of a sheet, film, foam, etc.) in order to adhere or laminate them with exhibiting excellent initial bonding strength and high heat resistance.

This invention is illustrated by the following Example and Reference Examples, but should not be construed to be limited thereto.

EXAMPLE 1 AND REFERENCE EXAMPLES 1 TO 3 PREPARATION OF A CHLOROPRENE ADHESIVE

Preparation of a chloroprene adhesive

By using the components as shown in Table 1 in an amount shown therein, chloroprene rubber is firstly kneaded with magnesia and active zinc oxide with a mixing roll for 20 times.

Separately, organic solvents are added to a vessel, and thereto is added the rubber kneaded product obtained above, and the mixture is heated at 40° C. for 12 hours to dissolve them. After dissolution treatment, an aminosilane is added to the solution, and the mixture is heated at 40° C. for 4 hours, by which the chloroprene rubber is modified with the aminosilane. To the reaction mixture is added a tackifier resin, and the mixture is stirred at 40° C for one hour to give an adhesive.

Test of adhesion

The adhesive prepared above was applied to #9 canvas in an amount of 400 g/m² and the canvas was piled onto a Zn-steel plate to prepare an adhesion test sample.

The test sample was aged and cured at 20° C., 65 % RH (relative humidity) for 72 hours, and then the dry adhesion (kg/25 mm) (i.e. the adhesion at ordinary state) was measured. Separately, the test sample was subjected to a creep test by keeping it in an atmosphere of 110° C. for 24 hours with loading of 200 g to one end thereof at the side of canvas, and the peel length thereof (heat creep properties) were measured. Also after heat aging treatment (at 90° C. for 400 hours) or after humidity heat aging treatment (at 50° C., 95 % RH for 400 hours), the adhesion (kg/25 mm) was measured. The results are shown in Table 1.

TABLE 1

| Components and Properties | Example 1 | Ref. Examples 1 | 2 | 3 |
|---|---|---|---|---|
| Chloroprene rubber *1 | 150 | 150 | 150 | 150 |
| Magnesia | 5 | 5 | 5 | 5 |
| Active zinc oxice | 1 | 1 | 1 | 1 |
| Aminosilane *2 | 5 | 5 | 5 | 5 |
| Tackifier resin: | | | | |
| Petroleum resin *3 | 50 | — | — | — |
| Alkylphenol resin *4 | — | 30 | 50 | — |
| Terpene-modified phenol resin *5 | — | — | — | 50 |
| Organic solvent: | | | | |
| Toluene | 300 | 300 | 300 | 300 |
| Cyclohexane | 300 | 300 | 300 | 300 |
| Acetone | 300 | 300 | 300 | 300 |
| Ethanol | — | — | — | 20 |
| Dry adhesion (kg/25 mm) | 10.9 | 12.1 | 11.5 | 11.4 |
| Heat creep properties (mm) | 0 | 0 | 0 | 0 |
| Adhesion (kg/25 mm) after heat aging treatment | 9.3 | 2.1 | 1.1 | 1.3 |
| Adhesion (kg/25 mm) after humidity heat aging treatment | 10.1 | 4.8 | 4.4 | 6.3 |

*1 Neoprene WHV, manufactured by Showa Neoprene K.K., Japan
*2 γ-Aminopropyltriethoxysilane (Sila Ace S-330, manufactured by Chisso K.K., Japan)
*3 Aromatic petroleum resin (Kisseki Neopolymer-80 (manufactured by Nippon Petrochemical Co., Ltd., Japan)
*4 Tamanol 372S (manufactured by Arakawa Kagaku Kogyo K.K., Japan)
*5 YS Polyster-2100 (manufactured by Yasuhara Yushi Kogyo K.K., Japan)

What is claimed is:

1. A one-pack chloroprene adhesive comprising:
   a chloroprene rubber modified with an aminosilane which is the reaction product of a chloroprene rubber and an aminosilane;
   a petroleum resin; and
   an organic solvent,
   wherein said aminosilance is a member selected from the group consisting of aminomethyltriethoxysilane, N-(β-aminoethyl) aminomethyltrimethoxysilane, aminomethylmethyldiethoxysilane, N-(β-aminoethyl) aminomethyltributoxysilane, γ-aminopropyltriethoxysilane, γ-aminopropylmethyldiethoxysilane, γ-aminoisobutyltrimethoxysilane, N-(β-aminoethyl)-γ-aminopropylmethyldimethoxysilane, and N-(βaminoethyl)-γ-amino-γ-methylpropyltrimethoxysilane.

2. The adhesive according to claim 1, wherein the petroleum resin is a member selected from the group consisting of $C_4$-$C_5$-$C_6$ aliphatic petroleum resins, $C_8$-$C_9$-$C_{10}$ aromatic petroleum resins, aliphatic-aromatic petroleum resins, and alicyclic petroleum resins.

3. The adhesive according to claim 1, wherein the petroleum resin and the organic solvent are incorporated in an amount of 5 to 100 parts by weight and 150 to 1,500 parts by weight to 100 parts by weight of the chloroprene rubber before modification, respectively.

* * * * *